United States Patent [19]
Devanagundy et al.

[11] Patent Number: 6,148,384
[45] Date of Patent: Nov. 14, 2000

[54] DECOUPLED SERIAL MEMORY ACCESS WITH PASSKEY PROTECTED MEMORY AREAS

[75] Inventors: Uday N. Devanagundy, Hayward; Taikhim Tan, San Jose; Stillman F. Gates, Los Gatos, all of Calif.

[73] Assignee: Adaptec, Inc., Milpitas, Calif.

[21] Appl. No.: 09/089,057

[22] Filed: Jun. 2, 1998

[51] Int. Cl.$^7$ ..................................................... G06F 12/16
[52] U.S. Cl. ............................ 711/163; 711/103; 710/129
[58] Field of Search ..................................... 711/163, 164, 711/103; 710/129; 713/1

[56] References Cited

U.S. PATENT DOCUMENTS

| | | | |
|---|---|---|---|
| 5,363,334 | 11/1994 | Alexander et al. | 365/185.04 |
| 5,410,680 | 4/1995 | Challa et al. | 395/500 |
| 5,517,646 | 5/1996 | Piccirillo et al. | 713/1 |
| 5,815,426 | 9/1998 | Jigour et al. | 365/51 |
| 5,920,708 | 6/1999 | Gates et al. | 710/129 |
| 5,991,179 | 11/1999 | Schweighofer | 363/71 |
| 6,002,737 | 12/1999 | Devanagundy et al. | 377/20 |

*Primary Examiner*—Hiep T. Nguyen
*Attorney, Agent, or Firm*—Skjerven Morrill MacPherson LLP; David T. Millers

[57] ABSTRACT

An integrated circuit such as a host adapter for connection to a system bus of a host computer includes a memory interface for a local memory including a serial memory such as an SEEPROM. The memory interface is capable of unsupervised multi-bit transfers between the serial memory and a data register in the memory interface. The host computer to access the serial memory starts the memory interface on a multi-bit access (i.e., read, write, or erase), checks a busy bit in the memory interface to determine when the access is complete, and accesses the data register. Thus, the host computer is decoupled from bit-by-bit management of transfers, and the integrated circuit or a bus device incorporating the integrated circuit requires less software overhead for use of serial memory. The memory interface further includes protection circuitry that prevents writing or erasing of a portion of the memory that a flag designates as protected. The flag is in a register that does not permit changes unless the host adapter is in a state such as corresponding to a target abort exists. Accordingly, the host can write or erase protected memory by causing a target abort, changing the flag to unprotect the memory, and then changing the memory. Since the state is unlikely to exist when a software might unintentionally access the flag, unintended changes to the protected memory are unlikely.

10 Claims, 5 Drawing Sheets

Microfiche Appendix Included
(1 Microfiche, 49 Pages)

DECOUPLED SERIAL MEMORY ACCESS WITH PASSKEY PROTECTED MEMORY AREAS

REFERENCE TO MICROFICHE APPENDIX

The present specification comprises a microfiche appendix. The total number of microfiche sheets in the microfiche appendix is one. The total number of frames in the microfiche appendix is 49.

BACKGROUND

1. Field of the Invention

This invention relates to memory interfaces for serial memory, particularly serial EEPROM, in system bus devices, and to methods for avoiding unintended changes to critical information stored in such memories.

2. Description of Related Art

Many integrated circuits (ICs) are configurable for a variety of different applications and require configuration data to set operating parameters. Often, when using a configurable IC, a manufacture connects the IC to a non-volatile memory such as ROM, PROM, EPROM, EEPROM, or flash memory that contains the necessary configuration data. Using an electrically erasable/programmable memory has advantages including the ease with which the memory can be programmed with configuration data during circuit manufacture, the ability to change configuration data without changing components, and the flexibility of being able to store and alter non-critical data in the same memory containing the configuration data. However, a concern when permitting writes to a memory that stores configuration data is the possibility of mistakenly corrupting critical information and making a circuit inoperable. Accordingly, methods and circuits are sought that make unintentional changes to critical data difficult or unlikely but that permit writing to a configuration ROM for changing critical and non-critical data when necessary.

An SEEPROM (serial electrically erasable programmable read only memory) offers a low cost and small foot print memory for critical and non-critical information. A disadvantage of a serial memory such as a SEEPROM is that the serial data stream for reads and writes results in relatively long access times. However, if the stored data is infrequently accessed, the long access times are not a great concern. Another disadvantage is the need to monitor or control each separate bit during an access of a serial memory.

One type interface for reading or writing to an SEEPROM requires software control of accesses to the SEEPROM. For example, computer systems are known which include a host computer and a system bus device such as a PCI card where the system bus device includes to an SEEPROM and the host computer executes a driver which controls and operates the bus device. To access the SEEPROM, the driver controls every aspect of the access, from writing addresses and opcodes to the SEEPROM to asserting clock signals with the appropriate timing and retrieving or sending each bit of data. After the driver initiates an access of the SEEPROM, the driver typically must poll the status of each bit being transferred (read or written) and provide for bit-by-bit transmission of data to or from the SEEPROM. This can be a slow process because SEEPROMs are slow devices, especially for write operations. Accordingly, methods and circuits are desired for reducing the software overhead required for access of an SEEPROM in a bus device.

SUMMARY

In accordance with the invention, an integrated circuit such as a host adapter for connection to a system bus of a host computer includes a memory interface for a local memory including a serial memory such as an SEEPROM. The memory interface is capable of unsupervised multi-bit transfers between the serial memory and a data register. The host computer to access the serial memory starts the memory interface on a multi-bit access (i.e., a read, write, or erase), checks a busy bit in the memory interface to determine when the access is complete, and accesses the data register (for reads and writes). Thus, the host computer is decoupled from bit-by-bit management of transfers, and the integrated circuit or a bus device incorporating the integrated circuit requires less software overhead for use of serial memory.

The memory interface can further include protection circuitry that prevents writing or erasing of a portion of the memory that a protection flag designates as protected. The protection flag is stored in a register that does not permit changes unless an error condition such as a target abort exists. Accordingly, the host computer can write or erase protected memory by starting a dummy SEEPROM operation, causing a target abort, changing the protection flag to unprotect the memory, and then changing the memory. Unintended changes to the protected memory are unlikely because unintentional change requires software to unintentionally change the protection flag during a target abort and unintentionally change the portion of memory that became unprotected.

In one embodiment of the invention, a host adapter includes a memory interface and a host interface. The memory interface connects to a serial memory such as an SEEPROM and includes a data register and a controller for the serial memory. The controller, when started, controls an unsupervised memory access that transfers multiple bits between the serial memory and the data register or erases a multi-bit portion of the serial memory. The host interface is for connection to a bus of a host computer and permits the host computer to start the controller and access the data register. Since the controller is capable of unsupervised multi-bit accesses of serial memory, a host computer coupled to the host interface does not need to control bit-by-bit transfers, and host adapter can be incorporated in bus devices which require a relatively low software overhead for use of serial memory.

In another embodiment of the invention, a circuit such as an integrated host adapter circuit includes: a memory controller; an address register that provides to the controller an address identifying a location to be accessed in memory; and a configuration register containing a protection flag that corresponds to a first portion of the memory and indicates whether the first portion of memory is protected from being changed. The configuration register only permits changes in the protection flag while the circuit is in a specific state or a specific error condition such as a target abort exists and the SEEPROM is being accessed. A protection circuit couples to the controller. In response to an address identifying a location in the first portion of the memory and the protection flag indicating the first portion of the memory is protected, the protection circuit disables the controller from changing data at the address. One embodiment of the protection circuit includes a comparator that compares the address from the address register to a boundary address for the first portion of the memory. The comparator has an enable terminal coupled to receive a signal indicating the value of the protection flag. A logic gate generates a signal to disable the controller in response to an access being a write or an erase and the comparator generating a signal indicating the address is within the first portion of the memory.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an embodiment of the invention, a bus device includes an SEEPROM and an SEEPROM control interface that once started can read, write, or erase one or more bytes in the SEEPROM without intervention from a host computer. The SEEPROM interface decouples the host computer from the details of the access of the SEEPROM and thus reduces the software overhead of the bus device because the host computer does not need to control timing of a bit-by-bit access. Additionally, the bus device includes a control register containing one or more protection bits/flags which correspond to portions of an attached SEEPROM. A protection bit in the control register being set prevents writing or erasing in the corresponding portion of the SEEPROM. Thus, setting protection bits protects corresponding portions of the SEEPROM from write and erase operations. Further, software cannot change the protection bits unless the bus device is in a specific state, for example, a state corresponding to a target abort according to the PCI bus protocol. Changes of the protection bits can further be restricted to when the bus device is in the specific state and an access of the SEEPROM is in progress. In an embodiment of the invention, writing to a protected portion of the SEEPROM requires: starting a dummy SEEPROM access; causing a PCI target abort; clearing a protection bit to unprotect a corresponding portion of the SEEPROM; and writing to the unprotected portion of the SEEPROM once the dummy access is complete. Causing a PCI target abort during another access of the SEEPROM and setting the appropriate protection bit protects the new information from further changes. The combination of generating of a target abort during an SEEPROM access and changing a protection bit during the target abort provides a passkey for changing information in a protected portion of memory.

Figure 1:
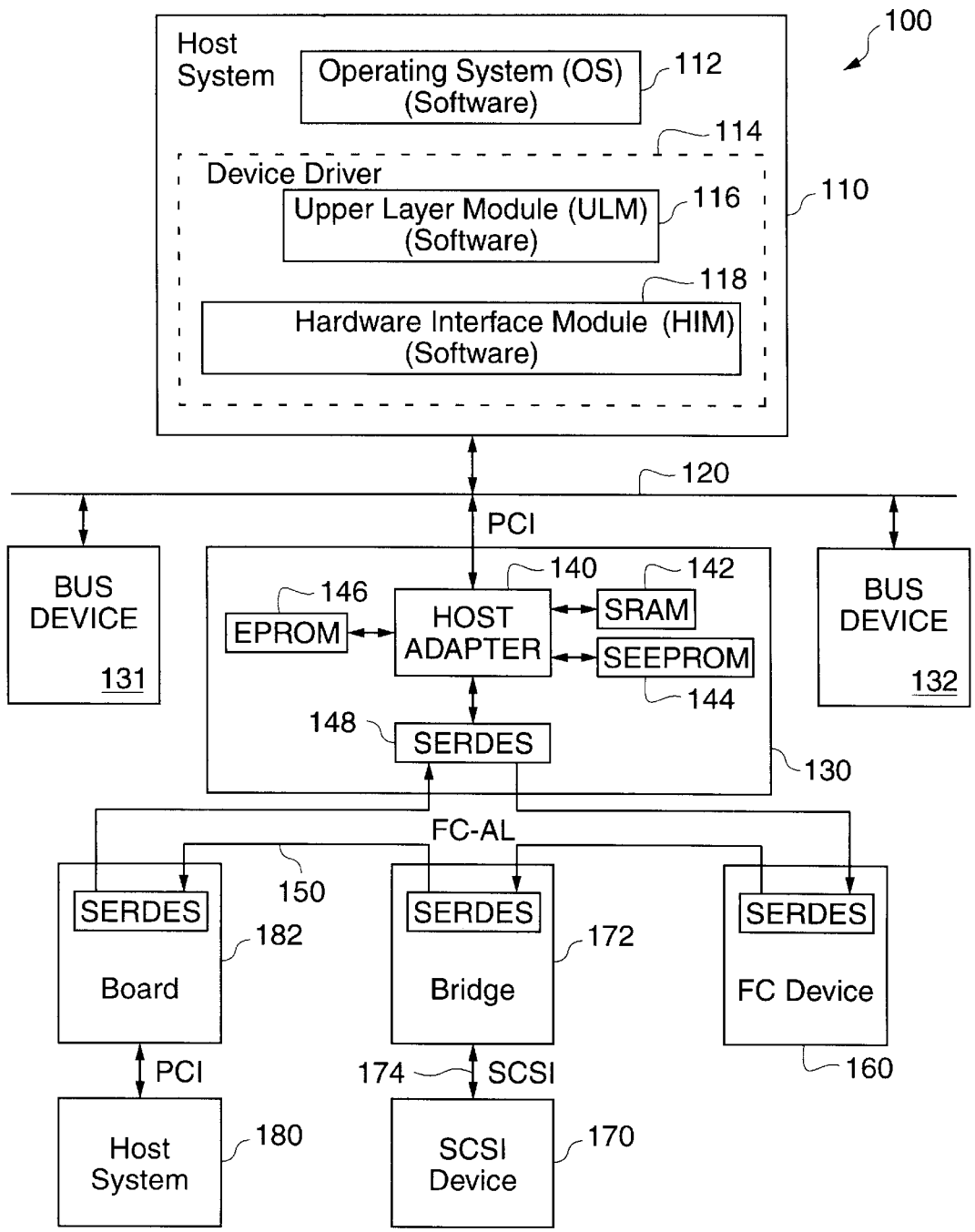
FIG. 1 is a block diagram of a computer system including a system bus device and a host adapter in accordance with an embodiment of the invention.

FIG. 1 shows a computing system 100 including a host adapter 140 in accordance with an embodiment of the invention. Computing system 100 includes a host computer 10, which has a system bus 120 to which bus devices 130 to 132 connect. Bus device 130 includes a serializer/deserializer (SERDES) 148 that connects to a peripheral bus (or loop) 150, host adapter 140 for control of the peripheral bus 150, and local memory for information used by host adapter 140 and host computer 110. Host computer 110 can communicate via device 130, with devices 160, 170, and 180 that connect to peripheral bus 150. In particular, host computer 110 executes software including an operating system 112 and a device driver 114 for devices 160, 170, and 180. Device driver 114 includes a hardware interface module (HIM) 118 that communicates with device 130 via bus 120 and an upper layer module (ULM) 116 that communicates with devices 160, 170, and 180 via HIM 118 and device 130.

In an exemplary embodiment of the invention, host computer 110 is a personal computer, system bus 120 is an industry standard peripheral component interconnect (PCI) bus, and bus 150 is a fiber channel (FC) bus. Device 130 is a PCI board in host computer 110. As an example application, devices 160, 170, and 180, which connect to bus 150, are respectively a fiber channel device such as a fiber channel hub, a SCSI device such as a hard drive, CD ROM drive, or DVD ROM drive which connects to bus 150 via a bridge circuit 172, and another computer system 180 having a board 182 for connection and communications via fiber channel bus 150.

Host adapter 140 is a programmable integrated circuit that includes a multi-tasking protocol engine. The protocol engine executes firmware required for control of communications between host computer 110 and devices on bus 150. Coupled to host adapter 140 is a local memory including volatile memory 142 and non-volatile memory 144 and 146. Volatile memory 142 can be any sort of conventional memory such a DRAM or an SRAM. In the exemplary embodiment of the invention, memory 142 is synchronous SRAM that includes one or more 64 k-by-18-bit chip. Volatile memory 142 stores information such as transfer control blocks (TCBs) and scatter/gather (S/G) lists for transfers to and from SCSI device 170, end-to-end credit values, page variables, and scratch memory for a protocol engine in host adapter 140. Co-filed U.S. patent application Ser. No. 09/089,044, further describes of a memory architecture suitable for accessing external memory and is incorporated by reference herein in its entirety.

The non-volatile memory includes a conventional EPROM, EEPROM or Flash memory 146 for information such as a BIOS the host uses for device 130 and an SEEPROM 144 for critical configuration information and non-critical information. In the exemplary embodiment, SEEPROM 144 is a 1-Kbit memory such as a 93C46 or 93C66 available from Atmel, Inc. that stores a world-wide port and node name, a local address, a subsystem-ID, a subsystem vendor ID, a preferred FC port address, size information for memory 146, and other board related data. The world-wide address is a world-wide unique address assigned to each port in the network and is represented as a 64-bit unsigned binary value. In addition, each node in a port has a 64-bit world-wide node address. The subsystem vendor ID and the subsystem board ID are 16-bit binary values. An 8-bit preferred FC port address, which is the address for device in an arbitrated loop, may also be stored in SEEPROM 144.

Figure 2:
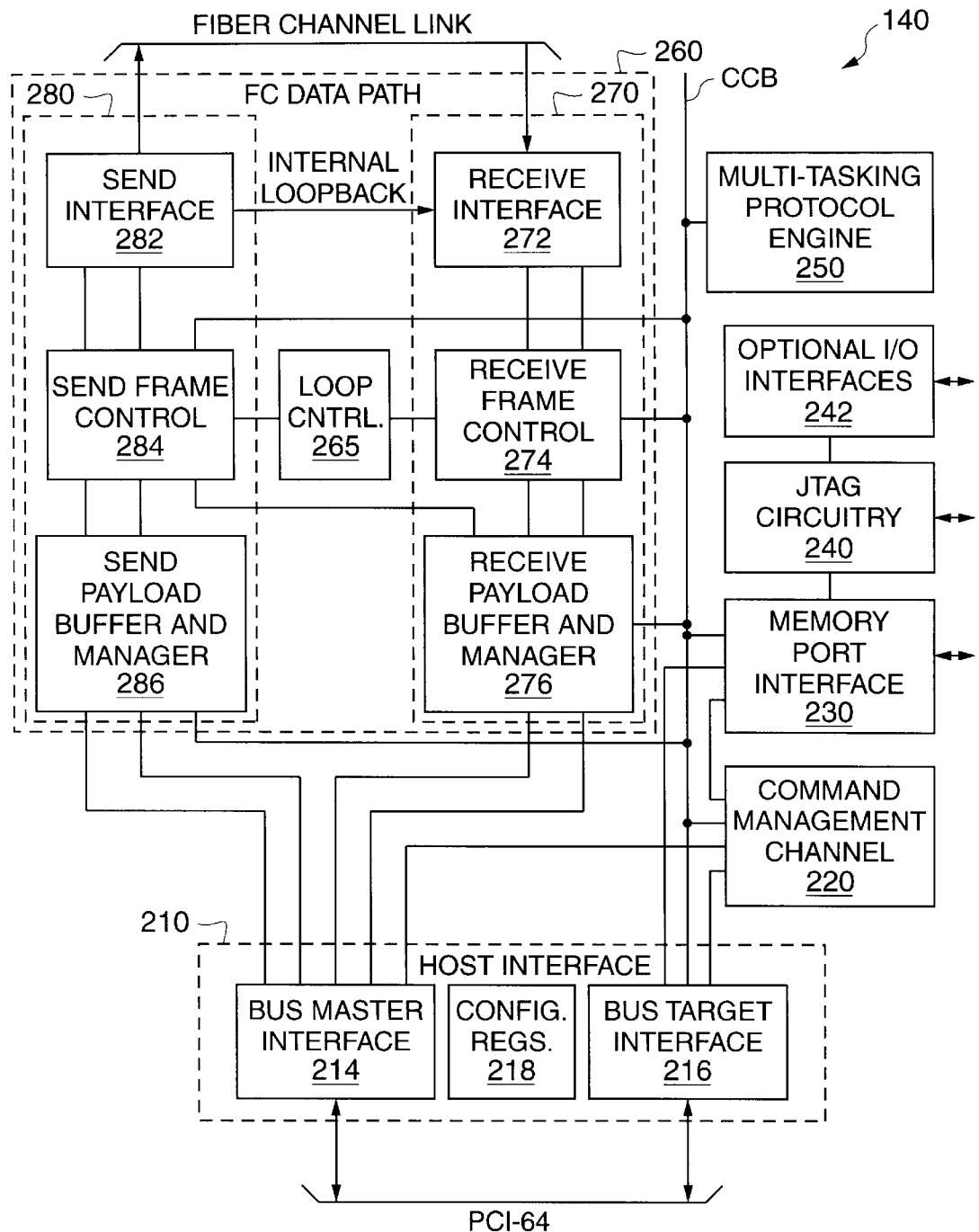
FIG. 2 is a block diagram of the host adapter shown in FIG. 1.

FIG. 2 is a block diagram of the exemplary embodiment of host adapter 140.

In the exemplary embodiment, host adapter 140 includes a host interface 210, a command management channel (CMC) 220, a memory port interface (MPI) 230, a multi-tasking protocol engine (MTPE) 250, and a fiber channel data path 260. Host interface 210 connects to system bus 120 and implements PCI bus protocols that permit adapter 140 to act as either the bus master or target. As illustrated in FIG. 2, host interface 210 includes a bus master interface 214 that implements PCI bus protocols for a bus master and a bus target interface 216 that implements the protocols for a target on PCI bus 120. Configuration registers 218 contain configuration data for PCI interface 210 including a device base address, an IRQ, and configuration data for host adapter 140. In alternative embodiments of the invention, host interface 210 can employ any alternative host interface architecture including PCI interface circuits that are known in the art.

Data path 260 is the path for information sent or received via a fiber channel link (i.e., peripheral bus 150). As shown in FIG. 2, data path 260 includes a receive data path 270 for information received from the fiber channel link, a send data path 280 for information to be sent on the fiber channel link, and a loopback control circuit 265 for self-testing. Co-filed U.S. patent application Ser. Nos. 09/089,311, (now U.S. Pat. No. 6,070,200, issued on May, 30, 2000) 09/089,274, and 09/089,030 further describe the operation of an exemplary embodiment of data path 260 and components therein and are hereby incorporated by reference herein in their entirety.

MTPE 250 is a sequencer that controls information transfers such as defined by transfer control blocks (TCBs) and scatter/gather (S/G) lists in local memory. MTPE 250 is multi-tasking in that MTPE 250 can control multiple simultaneously pending transfers.

Command management channel 220 handles DMA transfers and contains a buffer and a DMA control circuit. DMA transfers are between the main memory of the host computer and the buffer in CMC 220 and between the buffer in CMC 220 and local memory 142. Accesses of local memory 142 are through memory port interface 230. Host computer 110 and command management channel 220 store TCBs and S/G lists in local memory 142 via DMA transfers. In the exemplary embodiment of the invention, the buffer in CMC 220 is 128 bytes, and the DMA control circuit handles DMA transfers of blocks up to 128 bytes, which is the size of a standard TCB for the exemplary embodiment of the invention. CMC 220 has a direct connection to memory port interface 230 to facilitate DMA transfers that do not interfere with other communications on a main internal bus CCB. CMC 220 can also access local memory via bus CCB to memory port interface 230.

Bus CCB is a cooperative communication bus that connects to MTPE 250, memory port interface 230, data path 260, CMC 220, and host interface 210. Co-filed U.S. patent application entitled "Source-Destination Re-timed Cooperative Communication Bus", Ser. No. 09/088,812 describes a suitable internal bus architecture and is hereby incorporated by reference in its entirety. To access local memory, protocol engine 250 must first acquire control of bus CCB from an arbitrator (not shown). Protocol engine 250 can then use an internal address to access a storage location in local memory via memory port interface 230. Host interface 210 or CMC 220 can similarly acquire control of bus CCB and access local memory via memory port interface 230. Access of storage locations in local memory is direct in that an internal address from MTPE 250 map to specific storage locations. MTPE 25 does not need to write a memory address to an address register while the internal address from MTPE 250 identifies the address register.

Memory port interface 230 provides an interface to local memory including volatile memory 142 and non-volatile memory 144 and 146. Memory port interface 230 also controls a test port 240 and other I/O interfaces 242. Test port 240 includes JTAG circuitry for JTAG testing and provides for initiation and output of results of self tests performed within host adapter 140. I/O interfaces 242 implement functions including a general purpose interface, an external request interface, an activity indicator interface, and a monitor interface. The general purpose interface includes generic, addressable pins for input and output signals. The external request interface provides for an external pause request and acknowledge for Peek/Poke operations, a firmware load request and acknowledge, and an external interrupt of host adapter 140. The activity indicator interface is an LED indicator output port for indicating the activity of host adapter 140. The monitor interface allows selection of internal signals from within host adapter 140 for external monitoring. The monitor port interface is generally for debugging of host adapter 140 during initial design and testing. Co-filed U.S. patent application Ser. No. 09/089,278 describes a monitor port with selectable trace support which the exemplary embodiment of the invention employs and is hereby incorporated by reference in its entirety. Interfaces 240 and 242, while useful, are not required and can be omitted. Additionally, other types of interfaces can be added according to the functions and desired testability of adapter 140.

Figure 3:
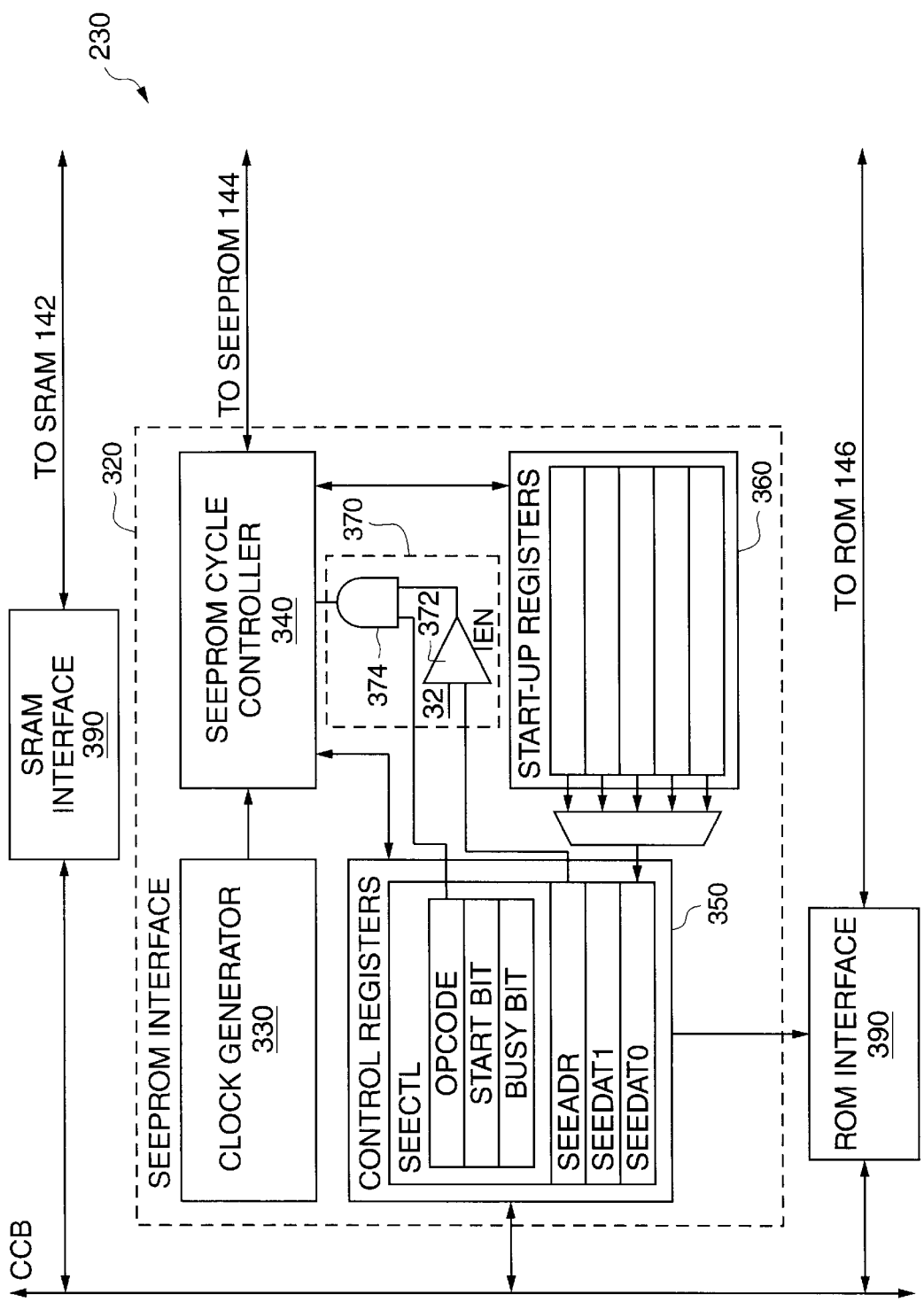
FIG. 3 is a block diagram of a portion of a memory interface in the host adapter of FIG. 2.

FIG. 3 shows a block diagram of an exemplary embodiment of memory port interface 230. Memory port interface 230 includes an SRAM interface 310, an SEEPROM interface 320, and a ROM interface 390. In the exemplary embodiment, SRAM interface 310 is an interface for synchronous SRAM that makes up memory 142 and contains TCBs, S/G elements, FC responses, and scratch memory for protocol engine 250. ROM interface 390 is an interface to non-volatile memory 146 which in the exemplary embodiment is an EEPROM that stores the system BIOS and may store firmware for MTPE 250. Memory interface circuits suitable for SRAM interface 310 and ROM interface 390 are known in the art and not described further here.

SEEPROM interface 320 includes a clock generator 330, a SEEPROM controller 340, control registers 350, internal registers 360, and protection circuitry 370. Clock generator 330 and controller 340 implement the protocols necessary for accessing SEEPROM 144. Controller 340 generates and interprets the signals to and from SEEPROM 144 as required to complete a multi-bit operation. Typical, multi-bit operations include reading or writing of 16 bit quantities. Control registers 350 contain the information that identifies the operation. In particular, a register SEECTL contains an opcode the identifies whether interface 320 will read, write, or erase a multi-bit portion of SEEPROM 144. Possible opcodes represent operations that read, write, or erase specific memory locations, specific ranges of memory locations, and the entire memory. An example opcode listing can be found in the data sheet for the AT93C56 available from Atmel, Inc. A device requesting access of SEEPROM 144 sets a start bit in register SEECTL to initiate an operation. The start bit doubles as a busy bit that remains set until controller 340 clears the busy bit in register SEECTL to indicate a completed operation. Registers SEEDAT0 and SEEDAT1 are for low and high bytes of a 16-bit data transferred. Register SEEADR contains an address if an address is required for the operation. The appendix contains verilog code listing for an exemplary embodiment of SEEPROM interface 320 and includes modules corresponding to clock generator 330 and controller 340.

In normal operation, protocol engine 250 or host computer 110 executes software which initiates a read, write, or erase operation to SEEPROM 144 via SEEPROM interface 320. For example, driver 114 initiates a read of memory 144 by writing an address in register SEEADR, writing an opcode identifying a read operation to register SEECTL, and setting the start bit in register SEECTL. Controller 340 upon recognizing the start bit is set begins the read operation. The start/busy bit remains set while an operation is in progress. Controller 340 then automatically executes the read indicated by the opcode in register SEECTL and transfers bits from memory 144 to registers SEEDAT0 (low byte) and/or SEEDAT1 (high byte). Once the read operation is complete, controller 340 clears the busy bit. The device that requested the read can periodically poll the busy bit to determine when the requested data is available in registers SEEDAT0 and SEEDAT1. Accordingly, in normal operations, software executed by host computer 110 or protocol engine 250 is decoupled from bit-by-bit management of a serial memory and can execute other functions while controller 340 completes a multi-bit operation. When a result is required, the software can periodically poll the busy bit to identify when the multi-bit operation is complete.

In addition to requested accesses, SEEPROM interface 320 automatically reads configuration information from SEEPROM 144 after a hardware reset. The automatic reading reads five words of configuration information starting at address 000h in SEEPROM. The five words are temporarily stored in internal registers 360 and transferred one byte at a time to register SEEDAT0. During the initial start-up period, ROM interface 390 is coupled to register SEEDAT0, and driver 114 in host computer 110 reads the configuration data from ROM interface 390. ROM interface 390 is used for configuration information because initially the host is not ready to access SEEPROM interface 320, and ROM interface 390 provides a convenient pre-existing data bus for conveying start-up information such a BIOS and the configuration data. Driver 114 initializes bus device 130 using the configuration information and uses the configuration information in subsequent communications.

SEEPROM interface 320 restricts write and erase operations to avoid unintended changes of critical data. In the exemplary embodiment, SEEPROM interface 320 includes protection circuitry 370 and prevents changes in the first 32 words of SEEPROM 144 when a protection bit/flag in host interface 210 is set. For a write operation, a device (e.g., host computer 110 or protocol engine 250) writes an address to register SEEADR, writes data to registers SEEDAT0 and SEEDAT1, and writes an opcode identifying a write operation and sets the start bit in register SEECTL. An erase of a specific storage location is the same manner except that the opcode is different and the initiating device does not need to write data to register SEEDAT0 or SEEDAT1. Protection circuitry 370 asserts a signal to controller 340 that disables a write or erase if the address from register SEEADR corresponds the protected area of memory and the protection bit indicates the area is currently protected. In FIG. 3, protection circuitry 370 includes a comparator 372 and an AND gate 374. If the protection bit is set, a signal EN enables comparator 372, and comparator 372 compares the value in register SEEADR with a boundary address (32) for the protected portion of SEEPROM 144. AND gate 374 has input terminals connected to the output terminal of comparator 372 and to an opcode bit from register SEECTL. Opcodes are such that the bit provided to AND is set for opcodes representing a write or erase and clear for a read. AND gate 374 asserts the signal which disables writing or erasing of SEEPROM 144 when the opcode in register SEECTL identifies a write or erase and comparator 372 indicates the address in register SEEADR is in the protected portion of SEEPROM 144. In response to an operation being disabled, controller 340 clears the busy bit without performing the write or erase. If the host initiated the write or erase of protected memory, MPI 230 generates a error signal MPI_ADD_INVALID to host interface 210, and host interface 210 generates a target abort.

As will be appreciated in view of this disclosure, the protection circuitry shown in FIG. 3 is just one example of circuitry which identifies an operation that would change protected memory. An alternative embodiment can include an opcode decoder that identifies operations that would change the protected memory. For example, a decoder can identify block erase operations which change at least a portion of the protected memory but do not require that register SEEADR contain an address corresponding to the protected portion of SEEPROM 144. In another embodiment, controller 340 includes separate sections including a write controller, an erase controller, and a read controller, and comparator 372 disables the write and erase controllers whenever the protection bit is set and the address of the location to be accessed is in the protected portion of memory 144. SEEPROM 144 can be divided into multiple protected memory areas each having a protection flag identifying whether the area is currently protected. Such an embodiment can include multiple comparators that compare addresses at the boundaries of the areas to the address for a memory access.

Figure 4:
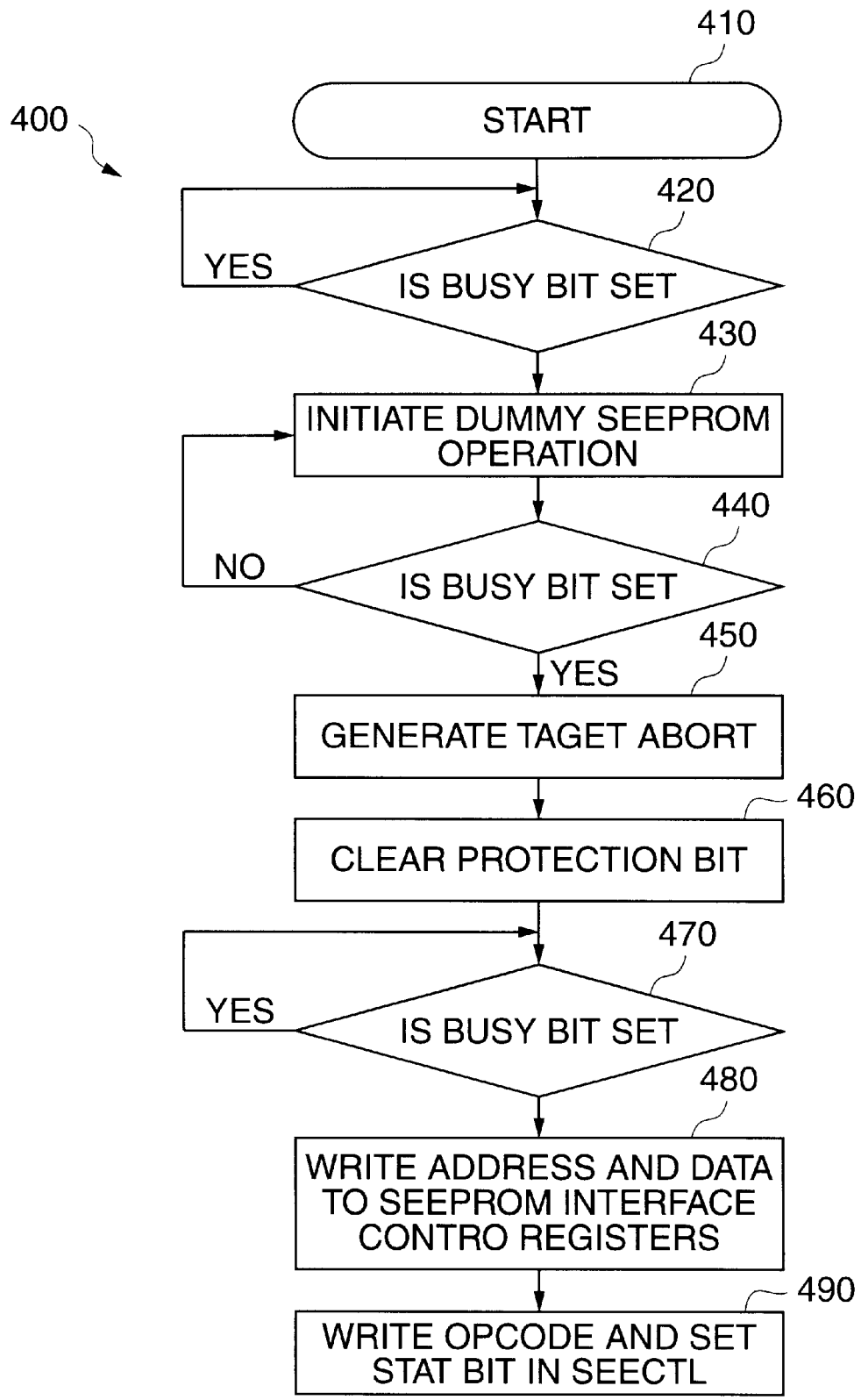
FIG. 4 is a flow diagram of a process for writing to a protected portion of a serial non-volatile memory coupled to the interface of FIG. 3.

A protected portion of SEEPROM can be written to or erased if the protection bit is cleared. However, in accordance with an aspect of the invention, the protection bit can only be changed if host adapter 140 is in a relatively rare state, specifically, when host adapter 140 is in the state resulting from a target abort according to the PCI protocol and the busy bit in register SEECTL is set. FIG. 4 illustrates a process 400 for writing to protected memory. Initially, write process 400 in step 420 checks the busy bit in register SEECTL to determine whether SEEPROM interface 320 is accessing SEEPROM 144. The access of SEEPROM 144 are conducted one at a time and can only begin once any pending access is complete and the busy bit is cleared. If the busy bit is set, a previously initiated operation is pending, and process 400 loops in step 420 until the previous operation is complete.

Once any pending operation is complete, driver 114 initiates a dummy SEEPROM operation, such as a read operation. While the busy bit is set for the dummy operation, driver 114 in step 450 causes a target abort in host adapter 140. (An optional step 440, which confirms that the busy bit is set for the dummy operation, is generally unnecessary.) Driver 114 can cause a target abort, for example, by attempting to write or read 16-bit data at an odd address in the local address space of host adapter 140 or by requesting any other operation that host adapter 140 is unable to perform. The protection bit is in one of registers 218 that has a write port that is disabled except when host adapter is in the target-abort state and the busy bit in register SEECTL is set. In step 450, which is before clearing the target abort and while the busy bit is set, driver 144 writes to an address in device 130 corresponding to the protection bit and thereby disables the protection circuitry in the SEEPROM interface. In the protection circuitry of FIG. 3, step 460 clears the protection bit and causes signal EN to disable comparator 372 so that neither comparator 372 nor AND gate 374 can assert a signal as required to disable writing and erasing.

Process 400 then waits in step 470 until busy bit is cleared indicating the dummy operation is complete. Driver 114 can then write to protected memory. Specifically, in step 480, driver 114 writes an address that is in the protected portion of memory to control register SEEADR and data to control registers SEEDAT0 and SEEDAT1. In step 490, driver 114 writes an opcode and sets the start bit in register SEECTL. An erase operation proceeds in the same manner as the write process 400 except that an erase does not required in data registers SEEDAT0 and SEEDAT1.

The order of steps in process 400 can be altered in many ways. For example, although FIG. 4 indicates that driver 114 repeatedly executes step 420 until the busy bit is clear, driver 144 after finding the busy bit set can execute some other function or release the processor to other tasks being executed in host computer 110. Driver 114 can check the busy bit again after the host processor execute the other tasks. Additionally, step 460, which clears the protection bit, must be performed during the target abort generated in step 450 while the busy bit is set, but initiating the dummy operation in step 440 can be before or after generating the target abort. Step 480, Which sets the start bit in SEEPROM interface 320 and writes the required address, can be performed as separate steps.

Figure 5:
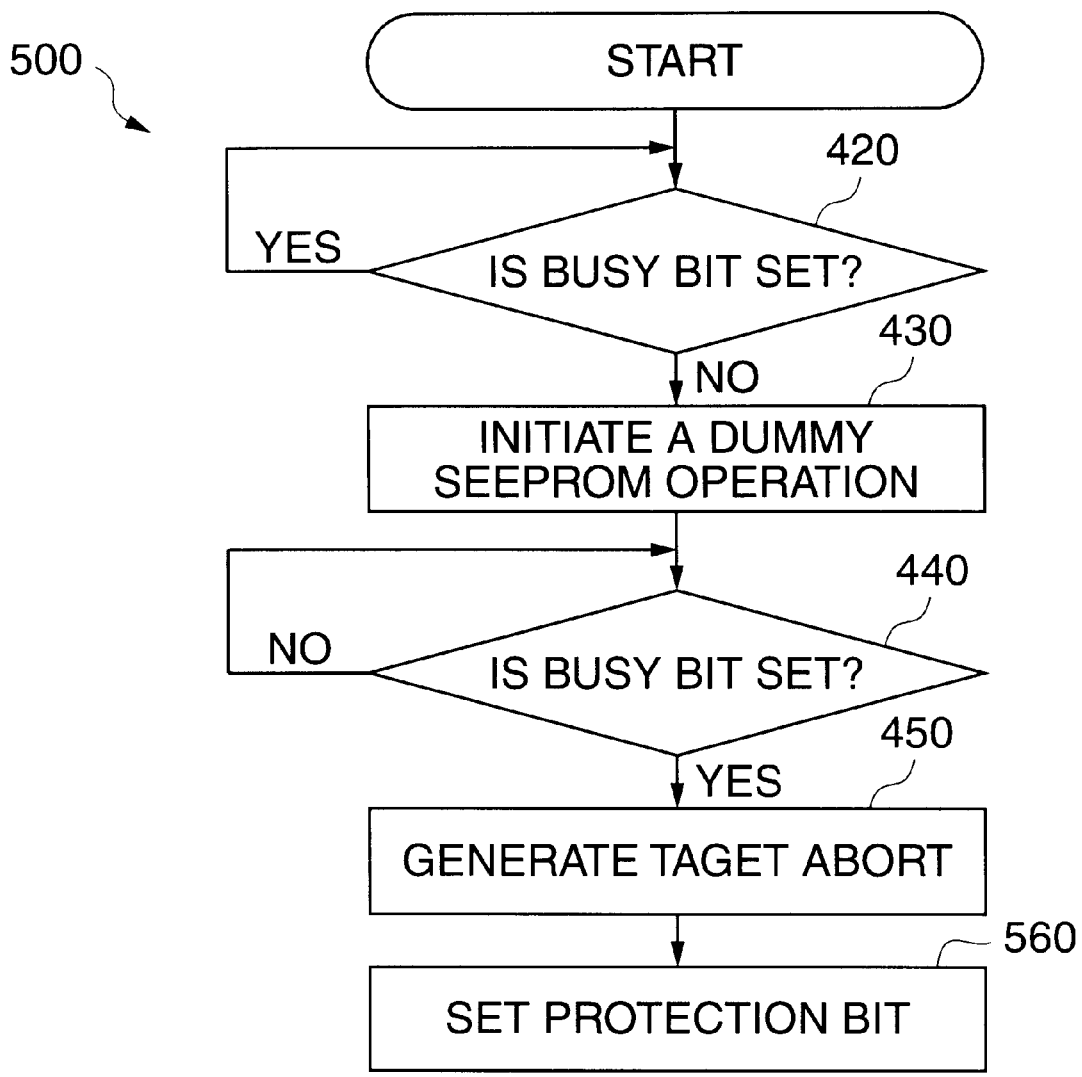
FIG. 5 is a flow diagram of a process for re-establishing protection for a portion of the serial non-volatile memory.

The changed data is reprotected by setting the protection bit. FIG. 5 shows a process 500 for reprotecting protected portion of SEEPROM 500. In process 500, driver 144 in step 420 reads register SEECTL to determine whether the busy bit is set. The busy bit may be set, for example, if a previous write to the protected portion of SEEPROM 144 has not completed. If the busy bit is set, driver 114 checks the busy bit later by again executing step 420. Once SEEPROM interface 320 is finished with any pending operation, driver 114 can reset the protection bit without interfering with the desired change to protected memory. Driver 114 in step 430 initiates a dummy SEEPROM operation (e.g., a read of any address) and in step 450 generates a target abort. (Step 440 just confirms that the busy bit is set for the dummy operation and is generally unnecessary.) While the busy bit is set and the target abort is active, process 500 in step 560 sets the protection bit by writing to the appropriate register. Once the protection bit is set, protection circuitry 370 in SEEPROM interface 320 is enabled and prevents writing or erasing of the protected potion for memory.

As described, an advantage of the protection circuitry in accordance with the invention is that all portions of SEEPROM can be changed if desired. Unintended changes are unlikely because such changes can only occur if the protection bit is cleared, and the protection bit can only be cleared in a rare state such as the combination of a target abort and an underway access of the serial EEPROM.

Although the invention has been described with reference to particular embodiments, the description is only an example of the invention's application and should not be taken as a limitation. For example, although the above description concentrated on an exemplary embodiment of the invention having a single protection flag and a single protected portion of memory, alternative embodiments included multiple protection flags corresponding to different portions of memory. Various other modifications, adaptations, and combinations of features of the embodiments disclosed are within the scope of the invention as defined by the following claims.

We claim:

1. A circuit comprising:
    a controller adapted to access of a memory;
    a first register coupled to the controller, the first register providing an address identifying a location to be accessed in the memory;
    a second register containing a flag that corresponds to a first portion of the memory and indicates whether the first portion is protected from being changed, the second register having a write port that enables changes in the flag only while the circuit is in an error state; and
    a protection circuit coupled to the controller, wherein the protection circuit disables the controller from writing in response to the location identified by the address being in the first portion of the memory and the flag indicating the first portion of the memory is protected.

2. The circuit of claim 1, further comprising a host interface for connection to a PCI bus, wherein the error state is a target abort.

3. The circuit of claim 2, wherein the memory is a non-volatile memory and the first portion of the memory stores configuration data for the circuit.

4. The circuit of claim 1, wherein the protection circuit comprises a comparator that compares the address from the first register to a boundary address for the first portion of the memory, the comparator having an enable terminal coupled to receive a signal indicating the value of the flag.

5. The circuit of claim 4, further comprising a gate that generates a signal to disable the controller in response to the comparator generating a signal indicating the address is within the first portion of the memory and an access that the controller is conducting being a write or an erase.

6. A method for changing data in a local memory of a bus device, comprising:
    changing the bus device from a first state for normal operations to a second state, wherein:
        the bus device contains a first register that stores a flag;
        the first register only permits changes in the flag while the bus device is in the second state;
        the flag indicates whether a first portion is protected; and
        when the flag indicates the first portion is protected, the bus device is unable to change data in the first portion of the local memory;
    changing the flag while the bus device is in the second state so that the flag indicates the first portion of the memory is not protected; and
    changing the data in the first portion of the memory while the flag indicates the first portion of the memory is not protected.

7. The method of claim 6, further comprising:
    placing the bus device in the second state after changing the data in the first portion of the memory; and
    changing the flag while the bus device is in the second state so that the flag indicates the first portion of the memory is protected.

8. The method of claim 6, wherein the bus device is coupled to a PCI bus of a host computer, and changing the bus device to the second state comprises causing a target abort in the bus device.

9. The method of claim 8, wherein causing the target abort comprises the host computer attempting an illegal access of the local memory of the bus devices.

10. The method of claim 6, wherein the bus device returns to the first state for normal operations.

* * * * *

UNITED STATES PATENT AND TRADEMARK OFFICE
CERTIFICATE OF CORRECTION

PATENT NO. : 6,148,384
DATED : November 14, 2000
INVENTOR(S) : Uday N. Devanagundy, Taikhim Tan and Stillman F. Gates It is certified that error appears in the above-identified patent and that said Letters Patent is hereby corrected as shown below:

<u>Column 3,</u>
Line 52, delete "10" and insert -- 110 --.

Signed and Sealed this

Third Day of December, 2002

JAMES E. ROGAN
*Director of the United States Patent and Trademark Office*